United States Patent Office 3,067,188
Patented Dec. 4, 1962

3,067,188
POLYMERIZATION OF 1,3-BUTADIENE WITH A TiCl$_4$-MoCl$_5$-ZnR$_2$ CATALYST
Floyd E. Naylor, Bartlesville, Okla., assignor to Phillips Petroleum Company, a corporation of Delaware
No Drawing. Filed Jan. 16, 1959, Ser. No. 787,124
4 Claims. (Cl. 260—94.3)

This invention relates to a novel catalyst system for the production of polymers of 1,3-butadiene having a high vinyl content.

Butadiene can be polymerized in the presence of a variety of catalysts to provide rubbery polymers which vary in their properties and have substantially different molecular configuration. It is known, for example, that butadiene can be polymerized by 1,2-addition, cis-1,4-addition, and trans-1,4-addition. The particular type of polymerization which occurs appears to be a function of the catalyst system employed, and in some instances what appears to be only a slight change in the catalyst system, e.g., the addition of a minor quantity of another component, will effect a marked change in the product.

It is known that if butadiene is polymerized in the presence of a catalyst system which contains an organometal compound, such as R$_n$M hereinafter described, together with titanium tetrachloride, a predominantly 1,4-addition polymer is obtained. It has been found, for example, that if butadiene is polymerized in the presence of a dibutylzinc-titanium tetrachloride catalyst system, a high trans polymer is obtained which is insoluble in carbon disulfide and toluene and resembles a plastic material more than an elastomer.

The following are objects of this invention.

An object of this invention is to provide a new process for the polymerization of 1,3-butadiene. A further object of my invention is to provide a new process for the production of polymers of butadiene having a high vinyl content. Other objects and advantages of the present invention will be apparent to one skilled in the art upon reading this disclosure. Broadly, I have invented a polymerization process which comprises subjecting 1,3-butadiene to polymerization conditions in the presence of a catalyst comprising (a) a compound of the formula R$_n$M where M is a metal selected from the group consisting of gallium, lead, zinc, mercury, and indium, n is the valence of the metal, and each R is individually selected from the group consisting of alkyl, aryl, cycloalkyl, alkylcycloalkyl, cycloalkylalkyl, aralkyl and alkaryl radicals, each of said radicals containing not over 10 carbon atoms, (b) titanium tetrachloride, and (c) molybdenum pentachloride, the total catalyst being 0.1 to 10, preferably 0.25 to 6 weight percent based on the monomer charged, the amount of R$_n$M being 0.8 to 3, preferably 1 to 2 mols per mol of total halide and the amount of titanium tetrachloride being 0.001 to 10, preferably 0.5 to 5 mols per mol of molybdenum pentachloride.

The addition of the molybdenum pentachloride results in a polymer formed predominantly by 1,2-addition. More specifically, when operating with the catalyst systems of this invention, generally at least 80 percent of the polymer is formed by 1,2-addition and in many instances it is 90 percent and higher. Suitable adjustment of the amounts of the various catalyst components provide systems with good conversion rates.

In carrying out the process of this invention, butadiene is subjected to polymerization in the presence of a catalyst comprising an organometal compound as set forth above, titanium tetrachloride, and molybdenum pentachloride. Examples of organometal compounds corresponding to the aforementioned formula, R$_n$M, include trimethylgallium, diethylphenylgallium, tri-n-decylgallium, triethylgallium, triisooctylgallium, tri-n-butylgallium, triphenylgallium, tribenzylgallium, tri-p-tolylgallium, tetraethyllead, tetraphenyllead, tetracyclohexyllead, triethylphenyllead, tetra(4-phenylbutyl)lead, diethylzinc, methylpropylzinc, dibutylzinc, di-n-hexylzinc, di(4-butylcyclohexyl)zinc, di-n-butylmercury, di-n-decylmercury, dicyclohexylmercury, methylethylmercury, tributylindium, tribenzylindium, tri(2,4-diethylphenyl)indium, and methylethylpropylindium.

The process of this invention can be carried out over a relatively wide temperature range, for example, between 0 and 150° C. with temperatures between 10 and 80° C. being preferred. Times are not critical, being of the order of 1 to 48 hours.

It is preferred that the polymerization be effected in the presence of a diluent, preferably an aromatic hydrocarbon such as benzene, toluene, ethylbenzene, or xylene, or a cycloaliphatic hydrocarbon such as cyclohexane, cyclopentane, methylcyclohexane or the like.

The production of rubbery polymers of butadiene in the presence of a catalyst system comprising an organometal compound of gallium, lead, zinc, mercury, or indium, such as is used in the present invention, together with molybdenum pentachloride, to give predominantly 1,2-addition polymers is described in my copending application, Serial No. 719,486, filed March 6, 1958, now abandoned and replaced by continuation application Serial No. 94,427, filed March 9, 1961. Since molybdenum pentachloride is a relatively expensive compound, the catalyst cost is significantly higher than it is in the present invention wherein only minor amounts of molybdenum pentachloride are required to produce a high vinyl polymer.

*Example I*

Butadiene was polymerized in a series of runs using a diethylzinc - titanium tetrachloride - molybdenum pentachloride catalyst system. The 1,3-butadiene employed was Phillips special purity grade. Prior to being used, it was distilled through ethylene glycol and stored at about −20° C. over Drierite (calcium sulfate). The diethylzinc was prepared by the reaction of zinc and ethyl bromide. The titanium tetrachloride was obtained from Columbia Southern. The molybdenum pentachloride was commercial grade (Climax Molybdenum Company) and was ball milled and passed through an 80 mesh screen before use. The diluent employed in these runs was toluene (Cosden). It was first distilled and then purified further by passing it downward through a column packed with stainless steel Heli-Pak while nitrogen was passed upward through the column. This treatment was effected at room temperature.

Polymerization was effected in accordance with the following recipe:

| | Grams |
|---|---|
| 1,3-butadiene | 100 |
| Toluene | 880 |
| Diethylzinc (Et$_2$Zn) | variable |
| Molybdenum pentachloride (MoCl$_5$) | 0.273 (1 mmole) |
| Titanium tetrachloride (TTC) | 0.569 (3 mmoles) |
| Temperature, °C | 50 |
| Time, hours | 23 |

Polymerization was effected in seven-ounce beverage bottles. Toluene was charged first and was followed by a one-minute purge with prepurified nitrogen. The molybdenum pentachloride was added as a solid followed by the titanium tetrachloride as a 0.365 molar solution in cyclohexane. Each bottle was then sealed with a self-sealing gasket which had been previously extracted with toluene, and capped with a crown bottle cap which was punched so as to expose a portion of the self-sealing gasket. The bottles were placed in a 50° C. bath and tumbled overnight. Thereafter, diethylzinc was introduced from a syringe as an 0.89 molar solution in toluene. Butadiene was charged in the same manner. The syringe needle used for charging these materials was inserted through the gasket.

After all ingredients were charged, the bottles were placed in a 50° C. bath and tumbled for 23 hours. At the end of this time the bottles were removed and to each was added 50 ml. of a solution prepared by dissolving 52 grams of phenyl-beta-naphthylamine in 4 liters of toluene and adding 100 ml. of isopropanol. The phenyl-beta-naphthylamine served as the antioxidant and the isopropanol as the shortstop for the reaction. After thorough mixing the contents of each bottle was poured into approximately one liter of isopropanol and the mixture was stirred vigorously. The polymer which precipitated was separated and dried overnight (12–16 hours) in a vacuum oven at 60° C.

The quantities of materials charged and results obtained in the several runs are shown in the following table:

| Run No. | $Et_2Zn$:TTC:$MoCl_5$ Mole Ratio | TTC [1] Grams | TTC [1] Mmoles | $MoCl_5$ [1] Grams | $MoCl_5$ [1] Mmoles | $Et_2Zn$:Total Halide Mole Ratio | Catalyst Level, g./100 g. Monomer | Conv. percent |
|---|---|---|---|---|---|---|---|---|
| 1 | 2.4:1:1 | 0.317 | 1.67 | 0.456 | 1.67 | 1.2:1 | 1.267 | [2] 78 |
| 2 | 3.0:1:1 | 0.252 | 1.33 | 0.363 | 1.33 | 1.5:1 | 1.109 | [3] 47 |
| 3 | 4.0:1:1 | 0.190 | 1.0 | 0.273 | 1.0 | 2.0:1 | 0.957 | [4] 20 |
| 4 | 3.6:2:1 | 0.417 | 2.2 | 0.301 | 1.1 | 1.2:1 | 1.212 | [3] 18 |
| 5 | 4.5:2:1 | 0.355 | 1.87 | 0.243 | 0.89 | 1.5:1 | 1.092 | [4] 15 |
| 6 | 6.0:2:1 | 0.252 | 1.33 | 0.183 | 0.67 | 2.0:1 | 0.929 | [4] 5 |

[1] Amount charged per 100 grams monomers.
[2] Contained 1% gel formed on initiator.
[3] Contained 2% gel formed on initiator.
[4] Gel not weighed separately.

The above products were all elastomers which had a high vinyl content as determined by infrared analysis.

Polymer samples prepared for infrared analysis contained no antioxidant. They were dissolved in carbon disulfide to form a solution containing 2.5 weight percent of the polymer. If the polymer, as prepared, contained antioxidant, it was removed by reprecipitating the polymer twice from cyclohexane prior to preparing the carbon disulfide solution.

In the infrared analysis procedure, the maximum absorption band used for trans-1,4 unsaturation was 10.3 microns, and the maximum absorption band used for determining vinyl unsaturation was 11.0 microns. The infrared spectra were taken on a Perkin-Elmer Model 21 spectrophotometer equipped with a sodium chloride prism. Compensation for the carbon disulfide solvent was obtained by placing a cell of appropriate thickness filled with carbon disulfide in the reference beam.

The absorbance values of trans-1,4 and vinyl unsaturation were determined at the 10.3 and 11.0 micron bands in the usual manner by determining log $(I_0/I)$, where $I_0$ and $I$ are the intensities of the incident and transmitted radiation, respectively.

The results are shown in the following table.

| Run No. | Unsaturation, percent | |
|---|---|---|
| | trans | vinyl |
| 1 | 4.3 | 91.7 |
| 2 | 4±1 | 84±1 |

Inherent viscosity was determined by placing 0.1 gram of polymer in a wire cage made from 80 mesh screen and immersing the cage in 100 milliliters of toluene contained in a wide-mouth, 4-ounce bottle. After standing at room temperature (approximately 25° C.) for 24 hours, the cage was removed and the solution was filtered to remove any solid particles present. The resulting solution was run through a Medalia viscometer in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

The cage containing the swollen gel was weighed after being removed from the toluene solution. It was then dried in a vacuum oven maintained at a temperature of 70–80° C. and weighed for dry gel. The gel was calculated as the weight percent of polymer insoluble in toluene. The swelling index is the weight ratio of swelled gel to dry gel.

As many possible embodiments can be made of this invention without departing from the scope thereof, it is to be understood that all matter herein set forth is to be interpreted as illustrative and not as unduly limiting the invention.

*Example II*

Butadiene was polymerized in a series of runs using the procedure described in Example I. The recipe employed was as follows:

|  | Grams |
|---|---|
| 1,3-butadiene | 100 |
| Toluene | 1200 |
| Diethylzinc | 0.494 (4 mmoles) |
| Molybdenum pentachloride | variable |
| Titanium tetrachloride | variable |
| Temperature, °C | 50 |
| Time, hours | 17 |

The quantities of materials charged and results obtained in the several runs are shown in the following table:

| Run No. | $Et_2Zn$ Chgd. Grams | $Et_2Zn$ Chgd. Mmoles | $Et_2Zn$:TTC:$MoCl_5$ Mole Ratio | $Et_2Zn$:Total Halide, Mole Ratio | Catalyst Level, g./100 g. Monomer | Conv. Percent | Remarks |
|---|---|---|---|---|---|---|---|
| 1 | 0.136 | 1.1 | 1.1:3:1 | 0.275:1 | 0.978 | 10 | resin. |
| 2 | 0.160 | 1.3 | 1.3:3:1 | 0.325:1 | 1.002 | 10 | Do. |
| 3 | 0.222 | 1.8 | 1.8:3:1 | 0.450:1 | 1.064 | 10 | Do. |
| 4 | 0.395 | 3.2 | 3.2:3:1 | 0.800:1 | 1.237 | 10 | elastomer. |
| 5 | 0.494 | 4.0 | 4.0:3:1 | 1.0:1 | 1.336 | 13 | Do. |
| 6 | 0.654 | 5.3 | 5.3:3:1 | 1.325:1 | 1.496 | 18 | Do. |
| 7 | 0.740 | 6.0 | 6.1:3:1 | 1.5:1 | 1.582 | 25 | Do. |
| 8 | 1.234 | 10.1 | 10.0:3:1 | 2.50:1 | 2.076 | 3 | Do. |

Infrared analysis on the product from Run 7 indicated a high vinyl content (around 90 percent or higher).

Inherent viscosity and gel determinations were made on the products from Runs 5 and 7 and swelling index was determined on the product from Run 7. Results were as follows:

| Run No. | Inherent Viscosity | Gel. Percent | Swelling Index |
|---|---|---|---|
| 5 | 3.81 | 4.0 | |
| 7 | 8.44 | 13.0 | 67 |

I claim:

1. A polymerization process for producing a polybutadiene at least 80 percent of which is formed by 1,2 addition, which comprises contacting 1,3-butadiene with a catalyst which forms on mixing together (a) diethylzinc, (b) titanium tetrachloride, and (c) molybdenum pentachloride, the total catalyst being 0.929 to 2.076 weight percent based on the monomer charged, the amount of diethylzinc being 0.8 to 2.5 mols per mol of total halide and the amount of titanium tetrachloride being 1 to 3 mols per mol of molybdenum pentachloride, said contacting occurring in the presence of toluene at a temperature of 50° C. and under autogenous pressure, and recovering the polymer so produced.

2. A polymerization process for producing a polybutadiene at least 80 percent of which is formed by 1,2-addition which comprises contacting 1,3-butadiene with a catalyst which forms on mixing together (a) dialkylzinc containing up to 10 carbon atoms in each alkyl group, (b) titanium tetrachloride, and (c) molybdenum pentachloride, the total catalyst being 0.25 to 6 weight percent based on the monomer charged, the amount of dialkylzinc being 0.8 to 2.5 mols per mol of total halide and the amount of titanium tetrachloride being 1 to 3 mols per mol of molybdenum pentachloride, said contacting occurring in the presence of an aromatic hydrocarbon diluent at a temperature in the range of 10 to 80° C. and under autogenous pressure, and recovering the polymer so produced.

3. The process of claim 2 wherein said dialkylzinc is diethylzinc.

4. The process of claim 2 wherein said dialkylzinc is dibutylzinc.

References Cited in the file of this patent

UNITED STATES PATENTS

| | | |
|---|---|---|
| 2,832,759 | Nowlin et al. | Apr. 29, 1958 |
| 2,846,427 | Findlay | Aug. 5, 1958 |
| 2,882,264 | Barnes et al. | Apr. 14, 1959 |
| 2,886,561 | Reynolds | May 12, 1959 |
| 2,900,372 | Gresham | Aug. 15, 1959 |
| 2,938,019 | Stuart | May 24, 1960 |

FOREIGN PATENTS

| | | |
|---|---|---|
| 543,292 | Belgium | June 2, 1956 |
| 215,043 | Australia | Nov. 1, 1956 |
| 789,781 | Great Britain | Jan. 29, 1958 |